United States Patent
Rudelic

(10) Patent No.: US 7,472,244 B2
(45) Date of Patent: Dec. 30, 2008

(54) SCHEME FOR SECURING A MEMORY SUBSYSTEM OR STACK

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 11/298,044

(22) Filed: Dec. 8, 2005

(65) Prior Publication Data

US 2007/0136542 A1  Jun. 14, 2007

(51) Int. Cl.
G06F 12/14 (2006.01)
G11C 16/04 (2006.01)

(52) U.S. Cl. .................. 711/163; 711/103; 365/185.04; 713/189

(58) Field of Classification Search ........................ None
See application file for complete search history.

(56) References Cited

U.S. PATENT DOCUMENTS

2004/0049645 A1*  3/2004  Lee et al. .................... 711/163
2005/0138314 A1*  6/2005  Liang et al. .................. 711/163
2006/0107009 A1*  5/2006  Ooshima et al. ............ 711/163

OTHER PUBLICATIONS

U.S. Appl. No. 11/188,254, filed Jul. 22, 2005—Method and Apparatus Capable of Disabling Authenticated Operations and Guaranteed Secure Boot in a Wireless Platform.
U.S. Appl. No. 11/130,759, filed May 17, 2005—Internally Authenticated Flash Remediation.
U.S. Appl. No. 11/237,306, filed Sep. 27, 2005—Secure Booting Form A Memory Device.

* cited by examiner

Primary Examiner—Denise Tran
(74) Attorney, Agent, or Firm—Trop, Pruner & Hu, P.C.

(57) ABSTRACT

A scheme for securing a memory subsystem or stack is disclosed. A first memory device performs an authentication on a received operation. If the authentication is valid, a write protect signal to a second memory device is disabled, allowing write or erase operations to be performed on the second memory device.

17 Claims, 4 Drawing Sheets

SCHEME FOR SECURING A MEMORY SUBSYSTEM OR STACK

BACKGROUND

Description of the Related Art

This invention relates generally to memory devices. Memory devices are used in many different types of systems to store software and data.

Many systems, such as handheld or portable devices, are vulnerable to attack from hackers, viruses, worms, and the like. Important data, for example, file system data stored in system memory, is often generated locally and routinely updated and thus vulnerable to undesired modification.

System engineers are constantly looking for mechanisms to prevent hackers, viruses, worms, and the like from altering important data stored in a system memory.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
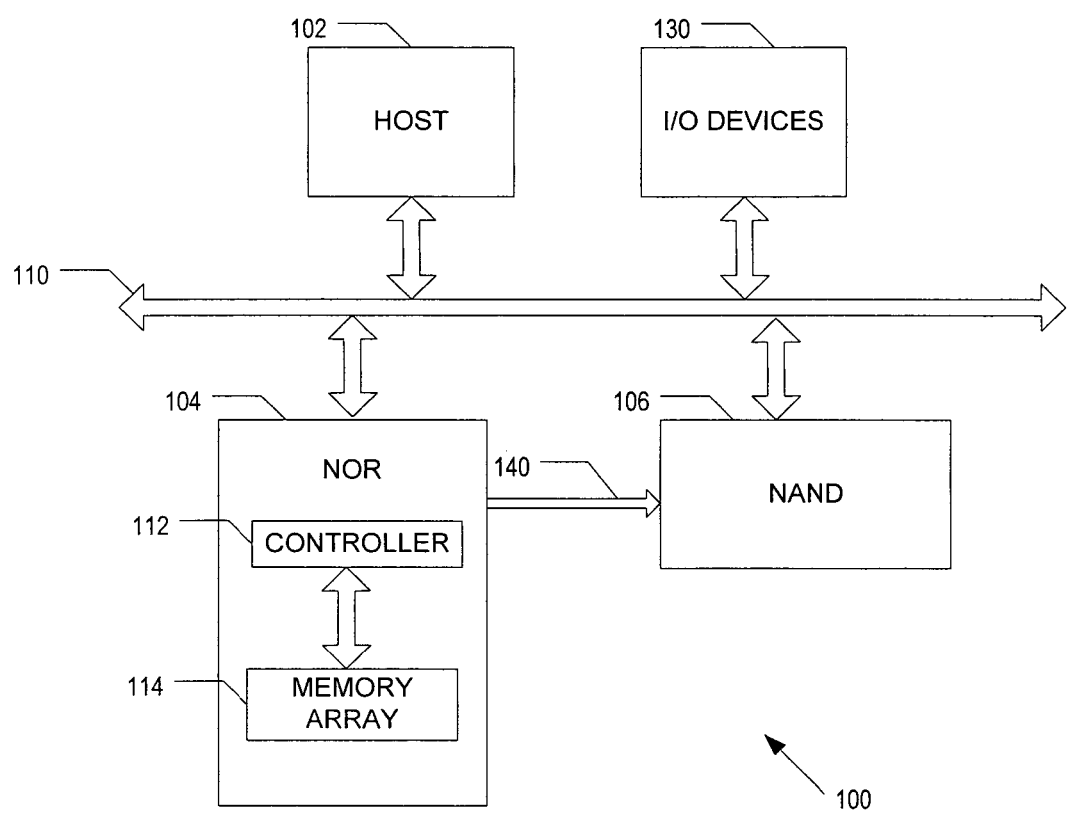
FIG. 1 illustrates a system utilizing a secure memory sub-system according to an embodiment of the present invention.

FIG. 1 illustrates a system utilizing a secure memory sub-system according to an embodiment of the present invention. System 100 includes a host processor 102 coupled to a first memory device 104 and a second memory device 106 via a bus 110. First memory device 104 includes a controller 112 and a memory array 114. Finally, a number of input/output devices 130 such as a keyboard, mouse, wireless interface, and/or display may be coupled to bus 110.

First memory device 104 may be a flash memory device. Flash memory is a type of memory that is non-volatile, that is, flash memory retains stored content without power. First memory device 104 may be any flash memory device that includes a controller such as controller 112. For example, first memory device 104 may be a NOR flash memory device which typically includes a controller, but may also be a NAND flash memory device that includes a controller, although controllers are not normally included in NAND flash memory devices. Controller 112 may be any controller including a microcontroller or a processor that runs general purpose commands. First memory device 104 and second memory device 106 may be a stacked component, although the current invention is not limited to this configuration.

First memory device 104 authenticates operations for second memory device 106. First memory device 104 generates a write protect signal 140 which is sent to second memory device 106. When an operation, for example, an erase or a write operation, to second memory device 106 is determined to be valid, first memory device 104 puts a value on write protect signal 140 which allows the operation to occur on second memory device 106. When the operation is determined to be not valid, first memory device 104 puts a value on write protect signal 140 which prevents the operation from occurring on second memory device 106.

Although system 100 is illustrated as a system with a single processor, other embodiments may be implemented with multiple processors, in which additional processors may be coupled to the bus 120. In such cases, each additional processor may share first memory device 104 and second memory device 106 for writing data and/or instructions to and reading data and/or instructions from the same. The embodiments of the invention are not limited in this respect.

System 100 may be any processor-based system including a wired or wireless system. It may be a system which is involved in wireless communications such as a cellular telephone. System 100 may be any of a variety of processor-based systems, including desktop computers, laptops, cellular telephones, digital media players, cameras, communications devices, personal digital assistants, set top boxes, medical equipment, or automotive equipment, to mention a few examples. Processor 102 may be a microcontroller, one or more microprocessors, or a digital signal processor, to mention a few examples. In one embodiment, the system may be battery powered, but in other embodiments, system 100 may be hard wired to a line power. The architecture shown in FIG. 1 is not meant to be limiting and the present invention may be adapted to any conceivable system architecture.

First memory device 104 utilizes controller 112 to authenticate operations for second memory device 106. Authenticated operations may be program operations that include additional information that may used by controller 112 to authenticate the entity requesting the authenticated operation. The additional information may range from public/private asymmetric key cryptography to simple password protection. Memory device 104 will not allow the operation to be performed on second memory device 106 unless the authentication is successful. The authenticated operations can prevent unwanted operations to second memory device 106.

The authentication operation may be any authentication function, including one which operates under the RSA algorithm, invented in 1978 by Ron Rivest, Adi Shamir, and Leonard Adlemen, a symmetric key, or a password, to mention a few examples. RSA is a cryptographic algorithm that offers a high level of security for digital data transfers. RSA uses a public key and a private key and incorporates modular exponentiation mathematics. Modular exponentiation of large integers may be efficiently computed within the public key function by repeated modular multiplications. Pipelining techniques or repetitive multiplication cycles may be used for the massive parallel computations.

According to embodiments of the present invention, the protection of authenticated operations can be extended to memory devices that do not support authenticated operations.

Figure 2:
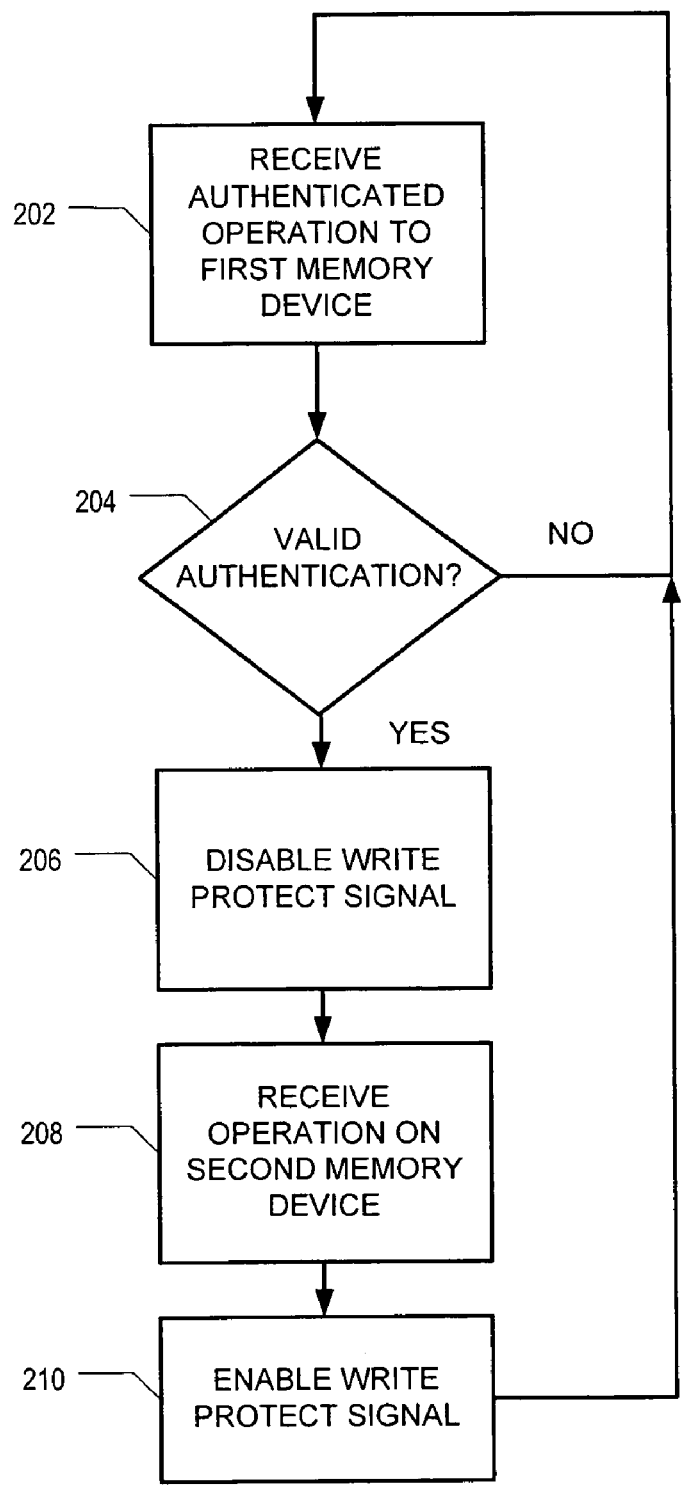
FIGS. 2, 3 and 4 illustrate secure memory sub-system flow diagrams according to an embodiment of the present invention.

FIG. 2 illustrates a secure memory sub-system flow diagram according to an embodiment of the present invention. Write operations to first memory device 104 are secure but write operations to second memory device 106 are not. However, write operations to second memory device 106 can only occur if the write protect signal from first memory device 104 is disabled. First memory device 104 may be a NOR flash device that stores a flash file allocation table (FAT) and second memory device 106 may be a NAND flash device that stores flash file system data. A file allocation table (FAT) is a table that provides a map of the sectors of data that a file has been stored in. When data is written to second memory device 106, the data is stored in one or more sectors that are not necessarily next to each other. The flash file system creates a FAT entry for the new data that records where each sector is located and their sequential order. When the data is read, the flash file system reassembles the data from sectors.

Referring to FIG. 2, an authenticated operation to first memory device 104 is received, block 202. For example, the authenticated write operation may be a write to a FAT table stored on first memory device 104. A determination is made whether the authentication of the operation is valid, block 204. If the operation is valid, first memory device 104 disables the write protect signal, block 206. A non-authenticated operation is allowed to proceed on second memory device 106, block 208. Multiple non-authenticated operations may be allowed to proceed on second memory device 106. For example, flash low level layer software may disable interrupts such that multiple sectors in the flash may be updated. Disabling interrupts effectively controls the duration that writes are allowed to the NAND memory. With interrupts disabled, the system, including malevolent code, can not regain control and write to the NAND flash. Upon a subsequent read to the second device or another event such as the enabling of interrupts or the expiration of a time period, the write protect signal is enabled, block 210.

Figure 3:
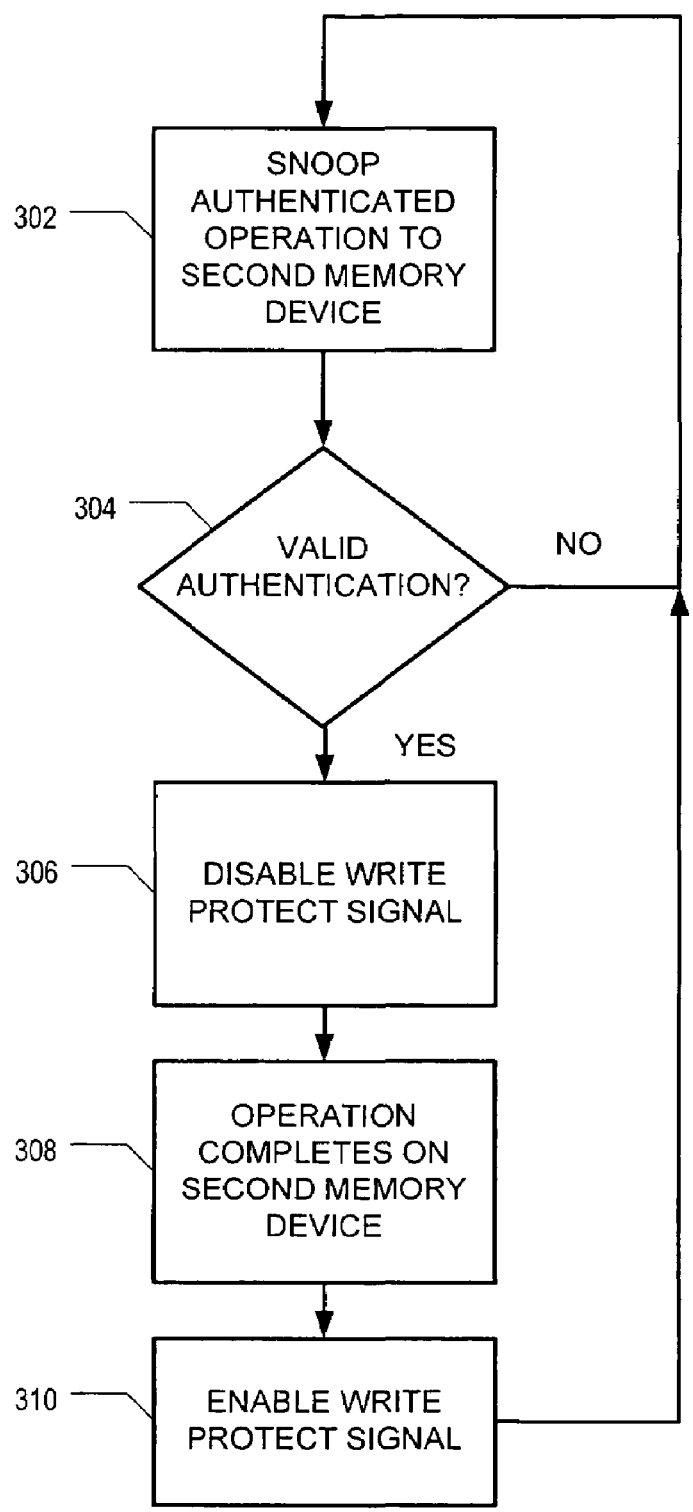

FIG. 3 illustrates another secure memory sub-system flow diagram according to an embodiment of the present invention. In this embodiment, writes to second memory device 106 are secure. Authentication information is sent in the first part of an access cycle, for example, in the form of a password. First memory device 104 snoops bus 110, authenticates the operation, and disables the write protect signal if the operation is valid, allowing the authenticated access to complete on second memory device 106.

Referring to FIG. 3, an authenticated operation to second memory device 106 is snooped by first memory device 104, block 302. First memory device 104 determines whether the authentication of the operation is valid, block 304. If the authentication is valid, first memory device 104 disables the write protect signal, block 306. The operation completes on second memory device 106, block 308. After the access is complete, first memory device 104 enables the write protect signal, block 310.

Figure 4:
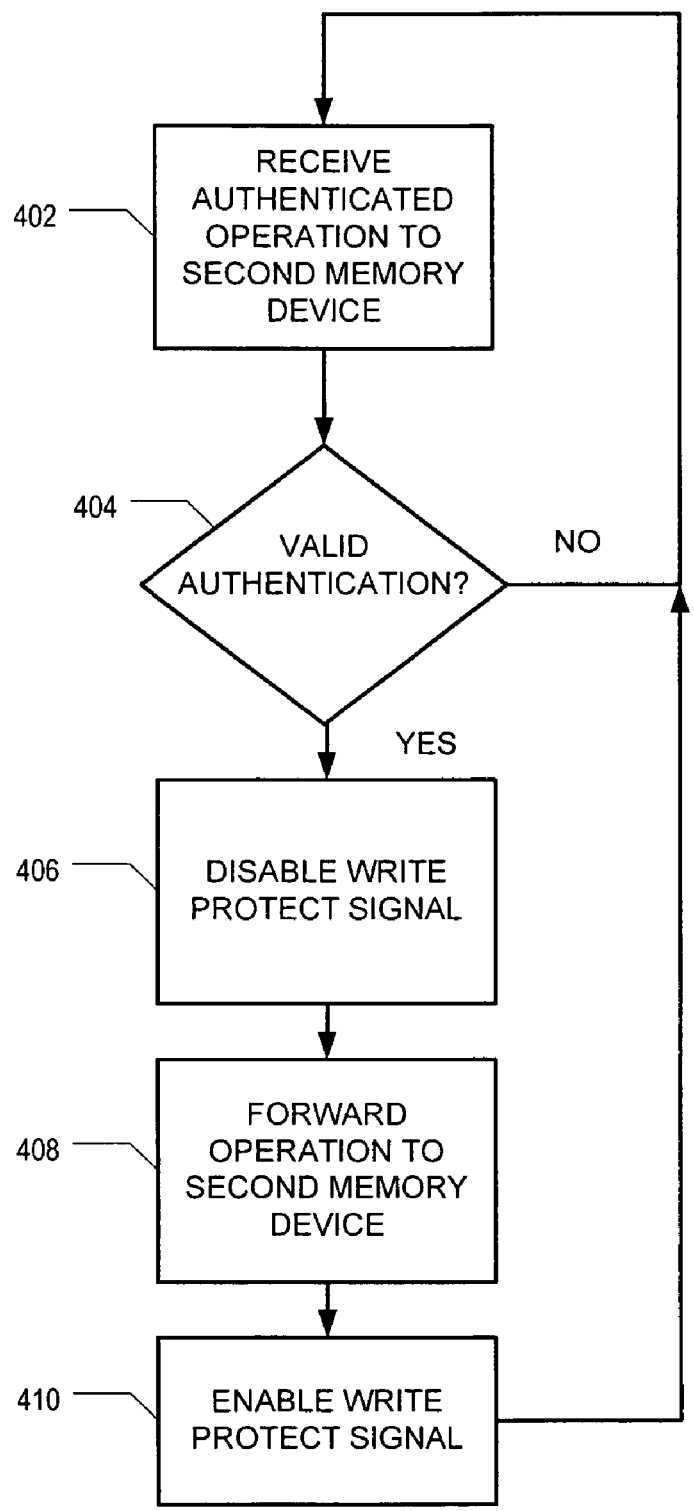

FIG. 4 illustrates another secure memory sub-system flow diagram according to an embodiment of the present invention. In this embodiment, first memory device 104 receives and authenticates all write or erase operations for second memory device 106. If an operation is valid, first memory device 104 disables the write protect signal and forwards the operation to second memory device 106.

Referring to FIG. 4, an authenticated operation to second memory device 106 is received by first memory device 104, block 402. First memory device 104 determines whether the authentication of the operation is valid, block 404. If the authentication is valid, first memory device 104 disables the write protect signal, block 406. First memory device 104 forwards the operation to second memory device 106, block 408. The write protect signal is enabled, block 410.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A memory device comprising:
   a first memory array; and
   a first controller configured to:
   control read and write operations to the memory array;
   perform an authentication of an operation; and
   enable and disable, based on a result of the authentication, a write protect signal to another memory device having a second memory array different than said first memory array and a second controller different from said first controller.

2. The memory device as recited in claim 1, wherein to perform the authentication, the first controller is further configured to receive an authenticated write operation to memory array and to disable the write protect signal if the authentication indicates the authentication is valid.

3. The memory device as recited in claim 2, wherein the authenticated write operation comprises an update to a file allocation table (FAT).

4. The memory device as recited in claim 2, wherein a disabled write protect signal allows an unauthenticated write operation to the other memory device.

5. The memory device as recited in claim 4, wherein the authenticated write operation comprises an update to a file allocation table (FAT), and the unauthenticated write operation comprises a write of FAT data.

6. The memory device as recited in claim 2, wherein the first controller is further configured to enable the write protect signal upon a read operation.

7. The memory device as recited in claim 2, wherein interrupts to the system are disabled when the write protect signal is disabled.

8. The memory device as recited in claim 1, wherein the memory device is a NOR flash memory device and the other memory device is a NAND memory device.

9. A system comprising:
a first memory device having a first controller;
a second memory device coupled to the first memory device via a bus, said second memory device having a second controller different from said first controller; and
a write protect signal from the first memory device to the second memory device;
where the first memory device is configured to perform an authentication of an operation from the bus and to enable and disable the write protect signal based on a result of the authentication.

10. The system as recited in claim 9, the first memory device comprising: a memory array; and said first controller configured to control read and write operations to the memory array and to perform the authentication.

11. The system as recited in claim 9, wherein to perform the authentication, the first controller is further configured to receive an authenticated write operation to memory array and to disable the write protect signal if the authentication indicates the authentication is valid.

12. The system as recited in claim 11, wherein the authenticated write operation comprises an update to a file allocation table (FAT).

13. The system as recited in claim 11, wherein a disabled write protect signal allows an unauthenticated write operation to the second memory device.

14. The system as recited in claim 13, wherein the authenticated write operation comprises an update to a file allocation table (FAT), and the unauthenticated write operation comprises a write of FAT data.

15. The system as recited in claim 11, wherein the first controller is further configured to enable the write protect signal upon a read operation.

16. The system as recited in claim 11, wherein interrupts to the system are disabled when the write protect signal is disabled.

17. The system as recited in claim 9, wherein the first memory device is a NOR flash memory device and the second memory device is a NAND memory device.

* * * * *